United States Patent [19]

Roop et al.

[11] Patent Number: 5,011,293

[45] Date of Patent: Apr. 30, 1991

[54] EMULSIFIER MIXING CELL

[75] Inventors: Donald E. Roop, Worthington; David L. Bachman; Eugene J. Mezey, both of Columbus, all of Ohio; Philip W. Bartram, Abingdon, Md.

[73] Assignee: The United States of America as represented by the Secretary of the Army, Washington, D.C.

[21] Appl. No.: 420,810

[22] Filed: Oct. 12, 1989

[51] Int. Cl.[5] .......... B01F 5/02; B01F 5/04; B01J 13/00

[52] U.S. Cl. .......... 366/173; 252/187.28; 252/309; 252/314; 366/176

[58] Field of Search .......... 252/187.28, 309, 314; 366/173, 176

[56] References Cited

U.S. PATENT DOCUMENTS

| | | | |
|---|---|---|---|
| 1,330,174 | 2/1920 | De Cew | 252/314 |
| 1,496,858 | 6/1924 | Knollenberg | 252/314 |
| 2,351,924 | 6/1944 | Carnauh | 252/187.28 |
| 2,509,288 | 5/1950 | Brochner | 366/173 |
| 3,936,036 | 2/1976 | Fries | 366/173 |
| 4,018,426 | 4/1977 | Mertz et al. | 366/173 X |
| 4,068,830 | 1/1978 | Gray | 366/176 X |
| 4,744,917 | 5/1988 | Scardera et al. | 252/187.28 |
| 4,908,154 | 3/1990 | Cook et al. | 252/314 |

*Primary Examiner*—Richard D. Lovering
*Attorney, Agent, or Firm*—Anthony T. Lane; Edward Goldberg; Edward F. Costigan

[57] ABSTRACT

A device for the continuous production or the production on demand of a water-in-oil emulsion from a water soluble chemical and an oil when mixed with an emulsifier. The device operates at relatively low pressures on the water and the oil lines. Water based chemical and the oil are each introduced into the cell through spray nozzles. The nozzles are positioned so as to cause the two sprays to intermix just prior to impinging on the wall of the cell. The action of the sprays and the force of impinging on the wall produces shearing action in the chemicals that helps in producing an emulsion. A long tube extends from the cylindrical cell. This tube contains a passive mixing element which causes the mixed chemicals to be further mixed and to undergo additional shearing action. The effect of the tube is to assure that the chemicals are held in a mixed state long enough for a stable emulsion to be formed.

5 Claims, 3 Drawing Sheets

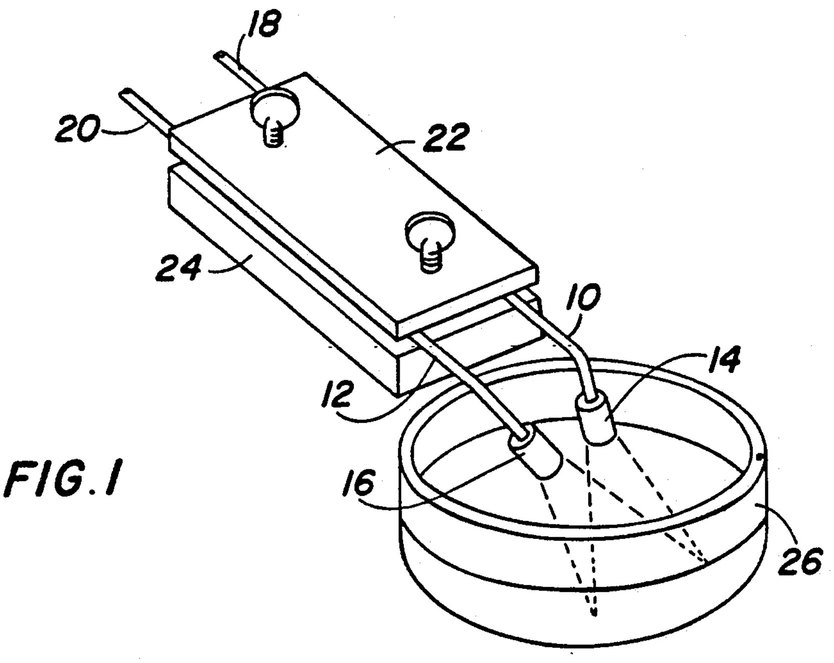
FIG. 1
FIG. 2
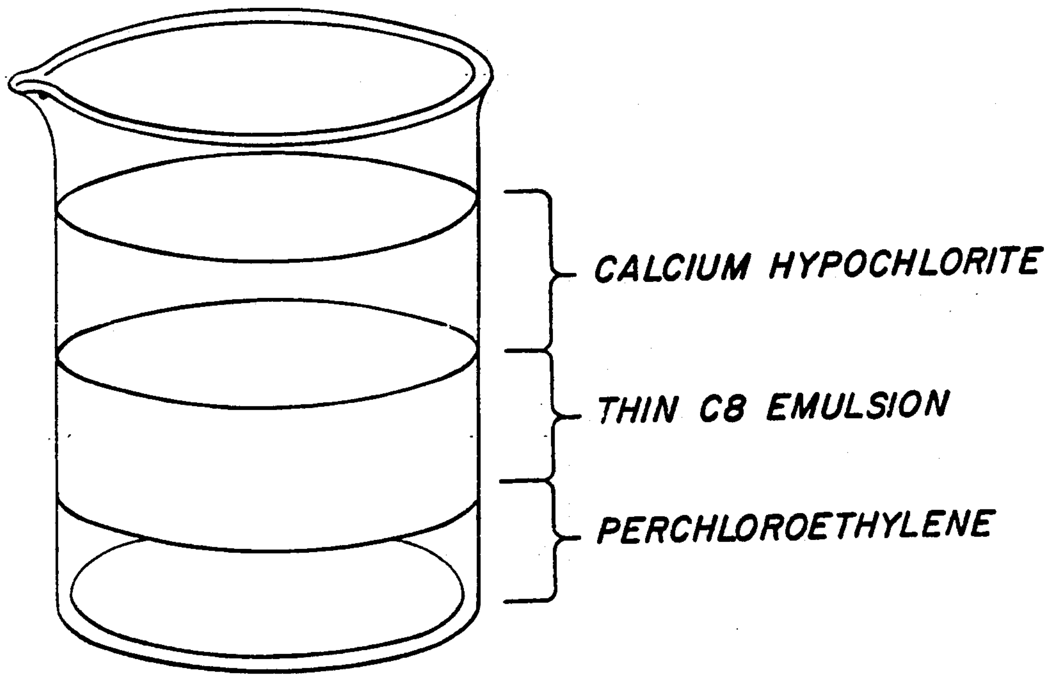

FIG. 3
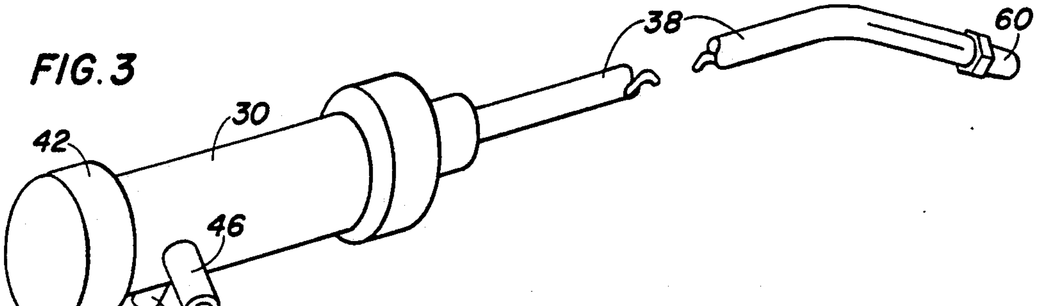
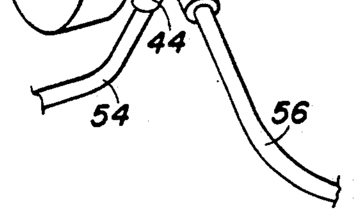
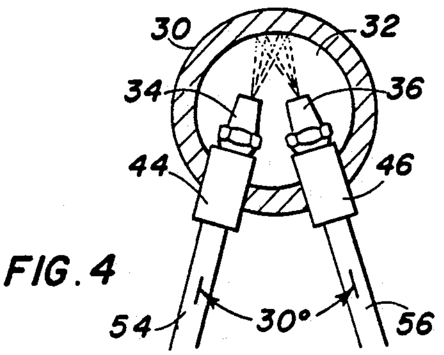
FIG. 4
FIG. 6
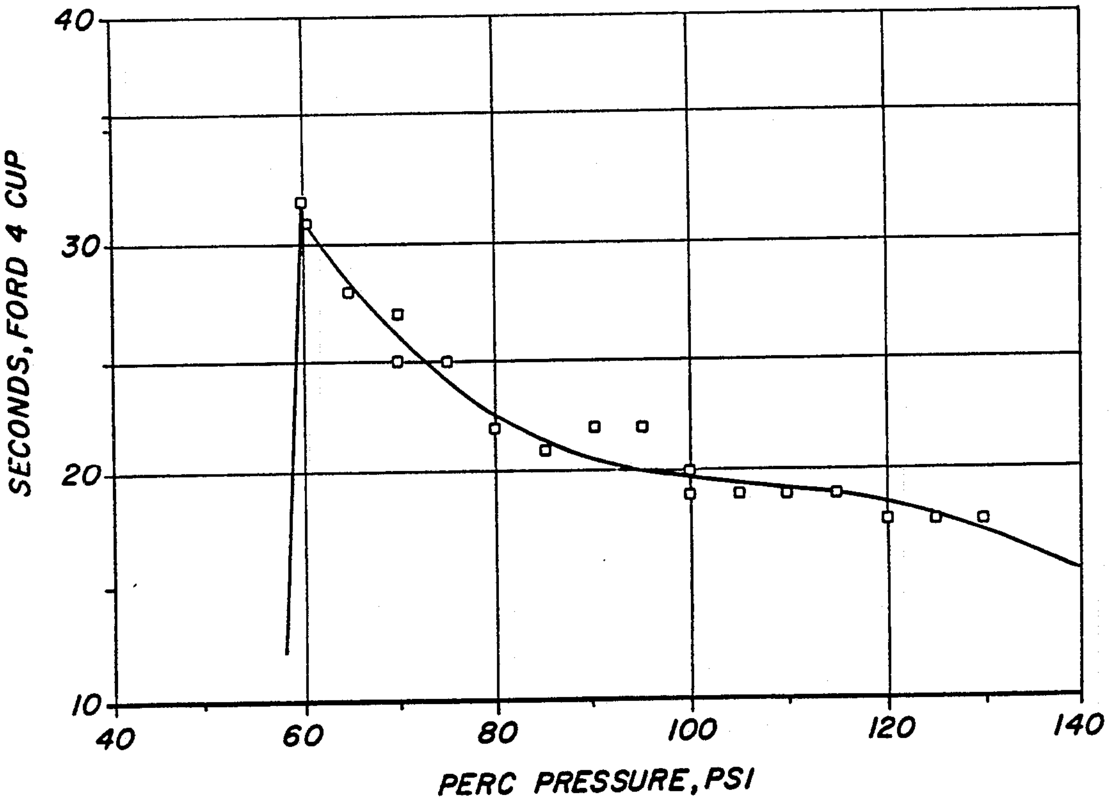

EMULSIFIER MIXING CELL

GOVERNMENTAL INTEREST

The invention described herein was made in the course of or under a contract or subcontract thereunder with the Government and may be manufactured, used and licensed by or for the Government for Governmental purposes without the payment to me/us of any royalties thereon.

FIELD AND BACKGROUND OF THE INVENTION

The German decontamination emulsion C-8 is made by mixing a calcium hypochlorite slurry with perchloroethylene and an emulsifier. Making the emulsion for use in the field is usually a batch process Currently, C-8 emulsion (15 percent perchloroethylene, 8 percent calcium hypochlorite, 1 percent emulsifier and 76 percent water) can be mixed in the field using an M12A1 Power Driven Decontamination Apparatus (PDDA). A calcium hypochlorite slurry is first mixed in this M12A1. The perchloroethylene-emulsifier mixture is then mixed with the slurry in the M12A1 until an emulsion is formed. A considerable amount of blending and agitation is required to form a proper emulsion. A continuous system must be capable of providing sufficient mixing to form a good emulsion without the residence time involved in the current method.

Mixing the German emulsion materials using current methods and equipment is also a labor-intensive task for the field soldier in full MOPP. Thus, practical decontamination will require that the emulsion be produced more quickly and easily.

SUMMARY OF THE INVENTION

The main object of the present invention is to provide an apparatus and method which is capable of either producing an emulsion continuously or producing an emulsion on demand.

The evolution of the invention began with a request from the U.S. Army to investigate the possibility of producing an emulsion continuously.

The basic premise of the present invention is that an emulsion may be created by spraying two streams of emulsion components against each other. One component is the calcium hypochlorite slurry and the other is the perchloroethylene and an emulsifier combination.

While an initial embodiment of the invention was capable of producing some emulsion in a continuous manner, additional features of the invention including the spraying of the two streams against the interior wall of a container and the use of a conveying conduit with passive mixing element therein, was more successful in producing an emulsion product.

Accordingly, another object of the present invention is to provide an apparatus for producing an emulsion having a water containing component and an oil containing component, comprising:

a cell having an interior wall;

a first nozzle connected to the cell for spraying one of the components against the interior wall;

a second nozzle connected to the cell for spraying the other component against the interior wall, the first and second nozzles being positioned so that the sprays of components intermingle with each other before striking the interior wall; and supply means connected to the first and second nozzles for supplying the one component to the first nozzle and for supplying the other component to the second nozzle.

A further object of the present invention is to provide such an apparatus wherein a tube is connected to the cell at a location spaced from the nozzles for conveying an emulsion away from the cell, and a passive mixing element in the tube for further mixing the emulsion.

A still further object of the invention is to provide a method of continuously producing an emulsion or of producing an emulsion on demand comprising spraying the two components of the emulsion at an angle toward each other for intermingling the components and in a direction to strike the interior wall of a cell for forming the emulsion, and conveying the emulsion from the cell in a tube containing a passive mixing element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of a first simplified version of the invention;

FIG. 2 is a perspective view showing a beaker containing the product of the apparatus shown in FIG. 1;

FIG. 3 is a perspective view with parts removed for clarity of a preferred embodiment of the invention;

FIG. 4 is a transverse sectional view of FIG. 3;

FIG. 6 is a graph relating emulsion viscosity to pressure of the perchloroethylene as a result of trials which were conducted to verify the usefulness of the present invention.

DESCRIPTION OF THE PREFERRED EMBODIMENTS

Figure 5:
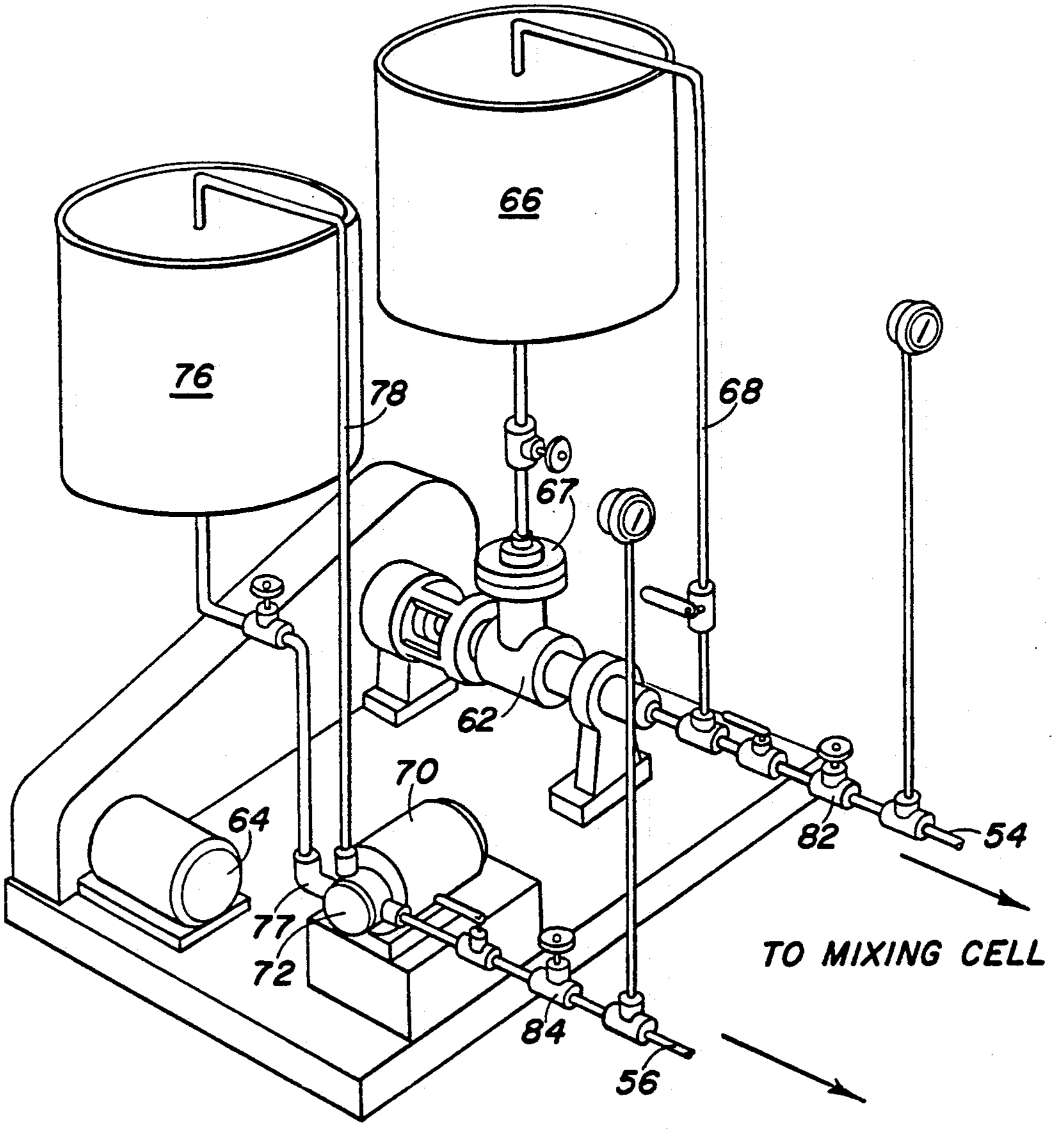
FIG. 5 is a perspective view of an emulsion component supply apparatus for supplying the emulsion components.

Referring to the drawings in particular, a first simplified version of the present invention is shown in FIG. 1.

This first embodiment of the invention consisted of two copper tubes 10 and 12, each about 2½ feet long with a bend of about 30 degrees 6 inches from one end. Nozzles 14 and 16 (also used in the later design) were installed on the bent ends of the tubes. The end of each tube opposite the nozzle was attached to a hose 18 and 20, which was attached to one of two chemical pumps. The two tubes were clamped in a set of wooden blocks 22 and 24. This first design was intended to simulate a mixing nozzle that would be used in the field. The two chemicals would be sprayed separately through the nozzles, onto a contaminated surface, where they would mix to form the decontamination emulsion.

By adjusting the position of each tube, the angle and distance between the two nozzles could be varied. In all trials, the tubes were adjusted so that the spray patterns from the two nozzles intersected. The spray from the nozzles was then directed into a metal bowl 26, with the spray hitting the wall of the bowl at about the point where the two sprays met.

With a few exceptions, similar results were obtained in all trials using the first cell. The mixture produced during a trial would rapidly separate into three phases as shown in FIG. 2. The upper part of the mixture would be calcium hypochlorite in water, the midpart would be what appeared to be stable emulsion, and the lower part would be a mixture of pure perchloroethylene and emulsifier. FIG. 2 shows typical results obtained with the first design. Varying the proportions of one chemical relative to the other would result in a slight variation in the amount of each of the three phases, but in nearly all cases the three phases existed. Occasionally, a stable emulsion would be obtained, but it would not be the desired viscosity. Usually it was too thin. Efforts to repeat the trial and obtain the emulsion a second time or to produce an emulsion with a different viscosity always failed.

A three phase product was consistently obtained in the trials with the first design. Varying the flow rates of the two chemicals varied only the quantity of each of the phases; it did not produce suitable quantities of emulsion. Analysis of the results indicated that the concept was feasible but that some other parameter was needed. Two things were identified that would enhance the possibility of producing a quality emulsion: keeping the mixed chemicals in contact with each other for a longer time and providing more shearing action while they are in contact.

Concepts for incorporating these two enhancements resulted in the final design. Confining the sprayed chemicals within a small chamber or cell and adding a tube to the chamber held the chemicals in contact with each other for a longer time. Adding a mixing element within the tube provided the additional shearing action that was needed.

The final cell design, which was the second design tried in the laboratory, proved successful: a stable emulsion was formed on the first trial. Despite initial difficulty in repeating the experiment, later trials were completely successful and produced an emulsion in every trial. By changing the flow proportions of the two chemicals, an emulsion with the desired viscosity could be produced.

The preferred embodiment of the invention is shown in FIGS. 3 and 4. The device comprises a cell 30 which has a small closed volume 32, with two nozzles 34 and 36 for chemical inlet and a single small tube 38 for mixed chemical outlet. The closed volume was made from a 2-inch pipe nipple that formed the body of cell 30, 5 inches long. One end of the nipple was closed with a pipe cap 42. The other end was reduced and fitted with a ⅜-inch copper tube 38. The two nozzles were installed at right angles to the centerline of the nipple.

The two chemical-inlet nozzles were mounted 1½ inches from one end of the 2-inch pipe nipple. A ½-inch pipe coupling 44 was inserted into a hole in the side of the pipe nipple and welded in place. Nozzle 34 was then screwed into the end of the coupling. A second ½-inch pipe coupling 46 was installed at an angle of 30 degrees to the first for nozzle 36. The nozzles were positioned such that the two spray patterns intersected just before contacting the side wall of the pipe nipple.

A size 1515 VEEJET nozzle 34 from Spraying Systems Company, Wheaton, Ill., was used in the calcium hypochlorite line 54. The 1515 nozzle is rated at 1.5 gallons per minute at 40 psi and at 2.4 gallons per minute at 100 psi. The trials were run at about 80 psi, where the nozzle is rated at 2.1 gpm.

A smaller nozzle (size 1504 VEEJET) was used in the perchloroethylene-emulsifier line 56. The 1504 nozzle 36 is rated at 0.4 gpm at 40 psi and at 0.63 gpm at 100 psi. The perchloroethylene-emulsifier mixture was ran through the 1504 nozzle at pressures from 40 to 120 psi. Stable emulsions were obtained at pressures from 80 psi to 120 psi.

Each of the spray nozzles 34 and 36 produced the same pattern. In one dimension the pattern spread at 15 degrees from the nozzle. In the other dimension the pattern was a nonspreading flat sheet.

The outlet tube 38 was attached to the emulsion cell 30 to increase mixing and to provide a spray wand for the emulsion. The outlet tube was constructed by inserting a coiled wire inside the ⅜ inch tubing. Two lengths were used at different times for the outlet tube, 3.5 feet and 9 feet. The coiled wire provided sufficient shearing action to increase the viscosity and stability of the emulsion.

Earlier studies had demonstrated that, when the perchloroethylene-emulsifier mixture was added to a solution of calcium hypochlorite in water, an emulsion could be formed only if the chemicals were relatively warm. However, when a solution of calcium hypochlorite and water was added to the perchloroethylene-emulsifier mixture, an emulsion was formed readily, even at temperatures as low as −2° C. (Roop, D. E., Reidy, J. J., Wyant, R. E. and Kanaras, L. *Preparation of C8 Decontaminant.* May 1987.)

The emulsion formed by the addition of calcium hypochlorite/water to perchloroethylene/emulsifier is a water-in-oil emulsion determined partially by the volume of the disperse phase (water/HTH) and the intrinsic viscosity of the continuous phase (perchloroethylene). The water-in-oil emulsion is also determined by the type of emulsifier used. The emulsion requires less mechanical agitation when the dispersed phase is slowly added to the continuous phase because of the previous criteria and because the perchloroethylene interfacial film is relatively the more permeable of the phases. The emulsion can be prepared by the addition of perchloroethylene/ emulsifier to the water/calcium hypochlorite with the use of low impeller shear and increased mixing time which allows hydration of the emulsifiers. High shears will not result in an emulsion being formed, or if formed the emulsions are unstable. It is believed, but not confirmed, that the addition of the oil phase to the water phase forms initially an emulsion with a reversed external phase. (Moilliet, J. L., Collie, B., and Black, W. D. *Surface Activity, The Physical Chemistry, Technical Applications, and Chemical Constitution of Synthetic Surface-Active Agents.* London: E & F. N. SPONLTD 1961.) This emulsion under continuous low shear mixing will invert to the desired water-in-oil emulsion. This inversion mechanism would explain the increase in emulsion viscosity.

In tests conducted with the emulsion cell of the invention, if the flow of calcium hypochlorite slurry was started first, the results were rarely successful. However, if the flow of perchloroethylene-emulsifier mixture was started first, a successful emulsion was achieved consistently. This phenomenon results from a requirement that equipment used in the production of emulsions be wetted with that liquid that constitutes the continuous phase. Unless this condition is satisfied, the emulsion will either be of the wrong type or be improperly dispersed and coalescence will occur.

During additional tests, the outlet tube 38 on the mixing cell 30 was changed from $\frac{3}{8}$-inch tubing to $\frac{1}{4}$-inch pipe to make it more rugged. The twisted wire within the outlet tube, used to create turbulence and shearing action in the mixture, was retained. A commercial nozzle 60 was added to the end of the spraying wand.

The commercial nozzle 60 at the end of the outlet tube 38 proved to be too small. With this restriction in the line, no significant changes in the flow ratios of the two chemicals could be made. By opening the area of the nozzle, the back pressure on the two nozzles inside the mixing cell was reduced and effective control of the flow ratio of the two chemicals was reestablished. The nozzle was opened to about 1/16 inch diameter, that is an area about four times the size of a 1515 nozzle. The resulting spray pattern was a 15 degree solid cone.

Only cursory flow measurements of each of the chemicals were made. These measurements indicated that the percentage of perchloroethylene and emulsifier in the final emulsion was somewhat higher than the 15 percent and 1 percent, respectively, called for in the C-8 emulsion formula. Accurate recorded data were not available to verify the percentages, however. One emulsion sample that was saved for several weeks showed a slight separation of excess perchloroethylene after the second or third week.

FIG. 6 shows the results of the trials. The line at 25 seconds and at 36 seconds show the desired lower and upper limit of emulsion viscosity. However, emulsions as thin as 21 seconds, as measured with the Ford 4 cup, were found to be quite tenacious in holding to a vertical surface and may be suitable for decontamination purposes.

FIG. 6 shows emulsion viscosity versus pressure of the perchloroethylene. In true fact the viscosity should be measured against perchloroethylene flow rate. In these tests, the calcium hypochlorite was pumped at a constant rate. The only variable was the flow rate of the perchloroethylene. Only the pressure of the perchloroethylene was measured as it entered the nozzle in the mixing cell. This pressure was proportional to the perchloroethylene flow rate. Since no direct measure of flow rate was available the pressure on the perchloroethylene was recorded and used as graphing parameter.

FIG. 5 shows the arrangement of the two chemical pumps that were used in the program experiments. These pumps were used to mix and to pressurize the chemicals used in the C-8 continuous mixing trials. A Robbins & Myers progressive-cavity (Moyno) pump 62 (Model 2L3, belt-coupled to a $\frac{1}{2}$-hp electric motor 64) was used for the calcium hypochlorite and water solution. This pump was selected because its rubber stator can handle foreign substances in a fluid without damage. Undissolved chemical grains pass through the pump, and recirculation line 68 returns the chemical to the reservoir 66 where it eventually dissolves.

The pump 62 used for the calcium hypochlorite is a positive-displacement pump, which can be operated at low speeds and still provide high pressure. It is constructed of heavy cast iron and steel and has a rubber stator liner. These materials are not fully compatible with the corrosive calcium hypochlorite; however, it was decided that the parts would serve adequately for the term of the program. Most centrifugal pumps have low head and high volume characteristics. These tests required the opposite: low volume and high head. A centrifugal pump was therefore, not used.

An Oberderfer pump 72 (Model 195020GEC-F06, direct-driven by a $\frac{1}{3}$-hp electric motor 70) was used to pump the perchloroethylene-emulsifier mixture. It is a gear pump, equipped with bronze gears and VITON seals. The VITON seals are essential when pumping perchloroethylene. The body of the pump is cast steel.

Each pump was supplied from its own reservoir of chemicals 66 and 76. For these tests, 20-gallon containers were used as reservoirs. Each container was mounted above a pump and piped directly to the inlet 67 and 77 of the pump. Bypass lines 68 and 78 from the pumps back to the containers recirculating the components, aided in mixing and in aerating the solution.

The outlet of each pump was connected to a flexible metal-reinforced plastic hose 54 and 56, which was attached to the mixing cell. Flow rate and pump discharge pressure were controlled by means of valves 82 and 84 in the pump discharge lines. The calcium hypochlorite pump 62 was always operated at full flow. The flow of perchloroethylene was varied to vary the proportions of the two chemicals.

Calcium hypochlorite and perchloroethylene are both corrosive chemicals. However, it was decided that the corrosiveness of each would be low enough that common metals could be used in the pumps and piping for the few months that this program would last. Neither pump is expensive, and for this type of research, they could be considered throw-away items. Moreover, equipment made from materials that would survive the corrosive chemicals are not readily available.

Some corrosion problems occurred, however: the pumps corroded each night, necessitating flushing them with water the next day before circulating the emulsion chemicals. The system still consists of the original parts, and all are still functional. However, because of the rate at which they are corroding, the pumps will probably not be useful for more than a few months.

Perchloroethylene usually causes non-metallic materials to swell and soften. VITON and TEFLON (tradenames) are the only common plastic or elastomeric materials that are not rapidly affected by perchloroethylene. Thus, it was necessary that we obtain a perchloroethylene pump that used VITON seals.

Copper tubing used in the pumping systems showed signs of corrosion by rapidly turning black or green. The copper parts are not expected to have service life much different from other metals.

While the specific embodiments of the invention has been shown and described in detail to illustrate the application of the principles of the invention, it will be understood that the invention may be embodied otherwise without departing from such principles.

The foregoing disclosure and drawings are merely illustrative of the principles of this invention and are not to be interpreted in a limiting sense. I/We wish it to be understood that I/we do not desire to be limited to the exact details of construction shown and described because obvious modifications will occur to a person skilled in the art.

What is claimed is:

1. An apparatus for producing an emulsion having a water containing component and an oil containing component, consisting essentially of:

a cylindrical cell having a circular interior wall;

a first nozzle passing through said cell for spraying the water containing component against said interior wall;

a second nozzle passing through said cell in space relation to said first nozzle for spraying the oil containing component against said interior wall, said first and second nozzles being positioned so that the sprays of all said components intermingle with each other in space relationship to said interior wall prior to impingement on said interior circular wall a plurality of means separably connected to the first and second nozzles for providing when needed said water containing component to the first nozzle and for providing said oil containing component to said second nozzle.

2. An apparatus according to claim 1 including a tube connected to the cell for discharging emulsion from the cell and a passive mixing element in the tube for further mixing the emulsion.

3. An apparatus according to claim 2 wherein the said space relationship of said second nozzle to said first nozzle is approximately 30 degrees.

4. An apparatus according to claim 3 wherein the cell has an axis, each of the nozzles being disposed substantially perpendicularly to the axis and the tube extending at least partly parallel to the axis.

5. An apparatus according to claim 4 having a nozzle connected to the end of the tube for further mixing the emulsion.

* * * * *